United States Patent
Kim et al.

(10) Patent No.: US 10,654,083 B2
(45) Date of Patent: May 19, 2020

(54) GLASSY CARBON ROLL-TYPE MOLD MANUFACTURING METHOD FOR FINE PATTERN FORMATION, AND GLASSY CARBON ROLL-TYPE MOLD MANUFACTURED BY THE METHOD

(71) Applicant: CHUNG-ANG UNIVERSITY INDUSTRY-ACADEMIC COOPERATION FOUNDATION, Seoul (KR)

(72) Inventors: Seok Min Kim, Seoul (KR); Jun Kim, Seoul (KR); Muhammad Refatul Haq, Seoul (KR); Young Kyu Kim, Seoul (KR)

(73) Assignee: CHUNG-ANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 163 days.

(21) Appl. No.: 15/887,564

(22) Filed: Feb. 2, 2018

(65) Prior Publication Data
US 2019/0210915 A1   Jul. 11, 2019

(30) Foreign Application Priority Data
Jan. 9, 2018   (KR) .................. 10-2018-0002626

(51) Int. Cl.
*B21B 27/02*   (2006.01)
*C03C 19/00*   (2006.01)

(52) U.S. Cl.
CPC ............ *B21B 27/021* (2013.01); *C03C 19/00* (2013.01)

(58) Field of Classification Search
None
See application file for complete search history.

(56) References Cited

U.S. PATENT DOCUMENTS

| 2010/0279068 A1* | 11/2010 | Cook | ............... C03B 23/26 428/141 |
| 2015/0017479 A1* | 1/2015 | Kim | ............... B29C 33/38 428/687 |

FOREIGN PATENT DOCUMENTS

| JP | 03188222 A | * 8/1991 |
| JP | 11189471 A | * 7/1999 |
| KR | 20160051186 A | * 5/2016 |

OTHER PUBLICATIONS

JP111189471A Machine Translation—Google Patents Performed on Sep. 6, 2019. (Year: 2019).*
KR10-20160051186A Machine Translation—Performed ProQuest Dialog, Jan. 8, 2020. (Year: 2020).*

* cited by examiner

*Primary Examiner* — Lisa L Herring
(74) *Attorney, Agent, or Firm* — Novick, Kim & Lee, PLLC; Sang Ho Lee

(57) ABSTRACT

Provided is a glassy carbon roll-type mold manufacturing method for fine pattern formation. The method is for manufacturing a glassy carbon roll-type mold configured to form a fine pattern having a micro-nano structure on a substrate including glass or a metal. The method includes: preparing a roll precursor including a thermosetting resin material, the roll precursor having a roll shape with a circumferential surface on which a pattern corresponding to the fine pattern is formed, the roll precursor being configured to press the substrate while rotating on the substrate; and carbonizing the roll precursor.

10 Claims, 7 Drawing Sheets

HIGH CARBON POLYMER
PATTERN ROLL MANUFACTURED
THROUGH ONE-STEP
HARDENING PROCESS

HIGH CARBON POLYMER
PATTERN ROLL MANUFACTURED
THROUGH TWO-STEP
HARDENING PROCESS

INJECTION OF HIGH
CARBON POLYMER
MATERIAL AND EXECUTION
OF THERMOSETTING
PROCESS

ROLL PRECURSOR
SEPARATED FROM
CYLINDRICAL MOLD

GLASSY CARBON ROLL-TYPE MOLD MANUFACTURING METHOD FOR FINE PATTERN FORMATION, AND GLASSY CARBON ROLL-TYPE MOLD MANUFACTURED BY THE METHOD

CROSS-REFERENCE TO RELATED APPLICATION

This application claims priority to Korean Patent Application No. 10-2018-0002626, filed on Jan. 9, 2018, in the Korean Intellectual Property Office, the disclosure of which is incorporated herein in its entirety by reference.

BACKGROUND

1. Field

One or more embodiments relate to a glassy carbon roll-type mold manufacturing method for fine pattern formation and a glassy carbon roll-type mold manufactured by the method, and more particularly, to a method of manufacturing a glassy carbon roll-type mold configured to continuously and precisely form a fine pattern having a micro-nano structure on a substrate such as a glass or metal substrate with high efficiency because the glass carbon roll-type mold is not easily deformed or damaged in a high-temperature, high-pressure environment and is easily separated from glass or metal.

2. Description of the Related Art

The manufacture of materials having various micro-patterns and/or nano-patterns has been required in applications such as displays, optical communications, data storage, diagnosis and treatment, development of new medicines, transportation, and energy applications, and the formation of plastic micro-patterns and/or nano-patterns using a plastic duplication process is popular because it incurs low production costs and is thus suitable for mass production of raw materials.

However, plastic products are not suitable for some applications because of various reasons such as low resistance to heat, chemicals, and moisture permeation, poor electrochemical characteristics, or lack of optical plastic materials. Thus, glass or metal micro-patterns and/or nano-patterns are required in applications in which it is difficult to use plastic materials.

It is known that among various processes for manufacturing glass or metal micro-patterns and/or nano-patterns, a duplication process using a molding press is the most suitable for mass production. However, unlike a mold used for a polymer duplication process, a mold used for a glass molding press process or a metal forming process is required to maintain shape stability, hardness, and corrosion resistance in a high-temperature (300° C. or higher), high-pressure (about 2.5 MPa to about 3.0 MPa) environment, and thus materials such as tungsten carbide (WC), aluminum nitride (AlN), titanium nitride (TiN), aluminum oxide ($Al_2O_3$), or stainless steel are used as mold materials.

Such mold materials are typical of difficult-to-machine materials, and thus a machining process basically including grinding is generally used to form an intaglio micro-pattern and/or an intaglio nano-pattern on a mold formed of such a mold material. However, in such a machining process, it is difficult to form shapes equal to or smaller than the minimal radius of a processing tip (generally from about 10 μm to about 100 μm). In addition, due to the characteristics of machining, machining costs increase exponentially as the amount of machining increases, and thus there is a limit to the formation of an array of micro-patterns and/or nano-patterns.

Although a fine pattern formation technique based on a semiconductor etching process may also be used to form micro-patterns and/or nano-patterns on a difficult-to-machine material mold, process costs are high because of a low etching rate. Therefore, it is needed to develop a new low-cost technique for forming micro-patterns and/or nano-patterns on a material which is stable in a high-temperature, high-pressure environment, so as to provide a low-cost, mass-production technique for forming glass or metal micro-patterns and/or nano-patterns.

Thus, Korean Patent Application Publication 10-2010-0128786 discloses a method of manufacturing a micro/nano mold for a glass molding press process through a carbonization process of a thermosetting resin which is a glassy carbon mold material having characteristics such as high-temperature hardness and corrosion resistance suitable for a glass molding press process, the method including forming a thermosetting resin based on a duplication process to form a glass structure having a micro/nano structure, and carbonizing the thermosetting resin.

In the related art, it is possible to manufacture an inexpensive mold having high resistance to heat and environmental factors for a duplication process of glass or metal micro-patterns and/or nano-patterns. However, since fine patterns are formed on a substrate while vertically moving such a mold with respect to the substrate, a structural design for implementing a pressing operation of the mold is required, and there is a limit to improving the efficiency of fine pattern formation. In addition, it is difficult to manufacture a product having a size equal to or larger than the size of a mold, and thus there is also a limit to manufacturing large products and improving productivity.

SUMMARY

One or more embodiments include a method of manufacturing a glassy carbon roll-type mold which is not deformed or damaged in a high-temperature, high-pressure environment and has high-quality surface characteristics so as to be used to efficiently form a fine pattern having a micro-nano structure on a large area of a substrate such as a glass or metal substrate.

One or more embodiments include a roll-type mold configured to efficiently form a fine pattern having a micro-nano structure on a substrate such as a glass or metal substrate, efficiently form a fine pattern on a large area, and suppress cracking or damage caused by contraction during a thermosetting process.

Additional aspects will be set forth in part in the description which follows and, in part, will be apparent from the description, or may be learned by practice of the presented embodiments.

According to one or more embodiments, there is provided a method of manufacturing a glassy carbon roll-type mold for forming a fine pattern having a micro-nano structure on a substrate including glass or a metal, the method including: preparing a roll precursor including a thermosetting resin material, wherein the roll precursor has a roll shape with a circumferential surface on which a pattern corresponding to the fine pattern is formed, and the roll precursor presses the substrate while rotating relative to the substrate; and carbonizing the roll precursor.

The preparing of the roll precursor may include: preparing a cylindrical mold having an inner surface on which a pattern corresponding to the fine pattern is formed; placing a core mold in a center portion of the cylindrical mold to form a ring-shaped space between the cylindrical mold and the core mold; and injecting a high carbon polymer material into the ring-shaped space, thermosetting the high carbon polymer material, and separating the high carbon polymer material from the cylindrical mold.

The thermosetting of the high carbon polymer material may include primarily incompletely hardening the high carbon polymer material in the cylindrical mold at a first temperature and secondarily completely hardening the high carbon polymer material at a temperature higher than the first temperature after separating the high carbon polymer material from the cylindrical mold, to prevent the roll precursor from being damaged by contraction during the thermosetting of the high carbon polymer material.

A shore D hardness of the roll precursor may be within a range from about 10 to about 60 after the primary incomplete hardening and may be 80 or greater after the secondary complete hardening.

The roll precursor may have a thickness of about 2 mm to about 8 mm to reduce deformation and internal defects during the carbonizing of the roll precursor.

The preparing of the roll precursor may include injecting a high carbon polymer material into an inner space of a cylindrical mold having an inner surface on which a pattern corresponding to the fine pattern is formed, thermosetting the high carbon polymer material, and separating the high carbon polymer material from the cylindrical mold.

The preparing of the roll precursor may include: preparing a solid core precursor having a smooth non-patterned outer surface and a solid center portion; coating the outer surface of the core precursor with a liquid high carbon polymer material to form a coating layer; and thermosetting the coating layer after wrapping a flexible pattern mold having a pattern corresponding to the fine pattern around the coating layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, glassy carbon roll-type mold manufacturing methods for fine pattern formation will be described according to embodiments of the present disclosure with reference to the accompanying drawings.

Figure 1:
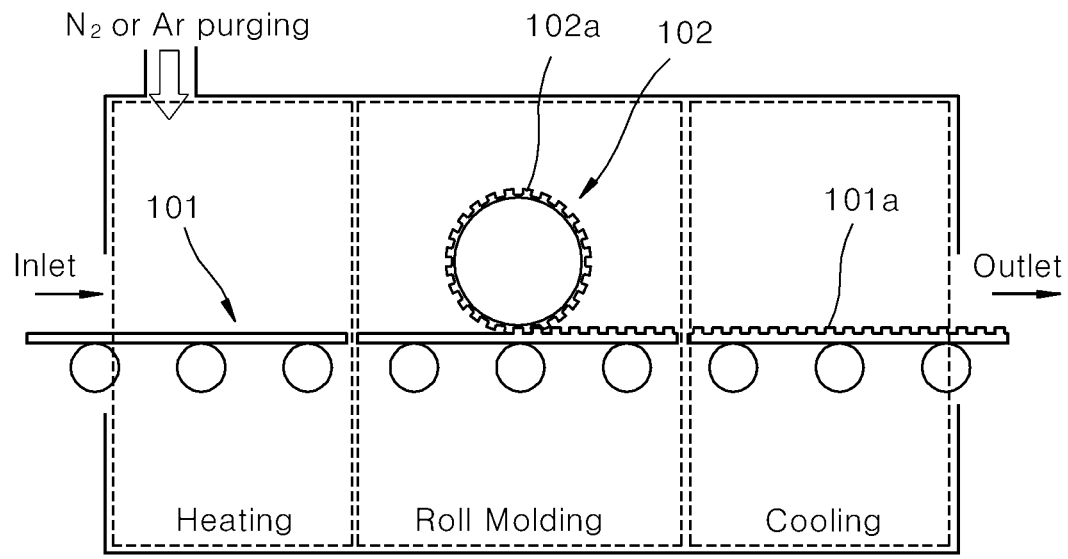
FIG. 1 is a view illustrating an example of using a roll-type mold manufactured by a glassy carbon roll-type mold manufacturing method for fine pattern formation according to an embodiment.
Figure 2:
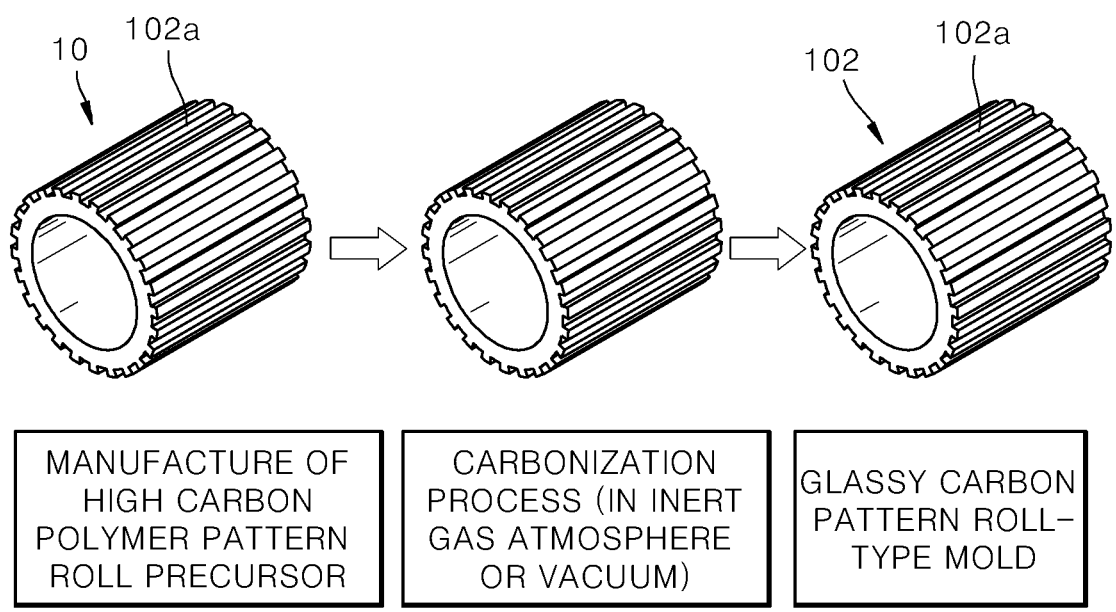
FIG. 2 is a view illustrating a process flow of a glassy carbon roll-type mold manufacturing method for fine pattern formation according to an embodiment.

FIG. 1 is a view illustrating an example application of a roll-type mold 102 manufactured by a glassy carbon roll-type mold manufacturing method according to an embodiment, and FIG. 2 is a view illustrating a process flow of the glassy carbon roll-type mold manufacturing method according to the embodiment.

As shown in FIG. 1, the roll-type mold 102 manufactured by the glassy carbon roll-type mold manufacturing method for fine pattern formation is configured to rotate relative to a (glass or metal) substrate 101 while the substrate 101 is transferred along an axis extending in one direction, to form a fine pattern 101a having a micro-nano size on the substrate 101. Therefore, the fine pattern 101a may be continuously formed on the substrate 101, which enables the formation of fine patterns 101a having various sizes by cutting the substrate 101 into intended sizes, and the formation of a fine pattern 101a over a large area.

Herein, "micro-nano size" is a term including both a micro size and a nano size, and the substrate 101 on which the fine pattern 101a is formed using the roll-type mold 102 may be used in applications such as non-reflective cover glass for solar cells, cover glass for portable electronic devices, plate glass for aesthetic improvements, optical elements for improving optical properties, metal plates for reducing drag, metal plates for improving the efficiency of heat transfer, and metal plates for anti-fouling or anti-icing.

The roll-type mold 102 for forming a fine pattern 101a on a substrate 101 is manufactured through a roll precursor fabricating process and a carbonization process as shown in FIG. 2.

A roll precursor 10 has a circumferential surface on which an intaglio pattern 102a corresponding to the fine pattern 101a is formed, and since the roll precursor 10 includes a high carbon polymer resin, the roll precursor 10 may be fabricated as a glassy carbon roll-type mold 102 through a carbonization process.

Here, the high carbon polymer resin includes a thermosetting resin such as cellulose, a furan resin, a phenolic resin, or a polycarbodiimide resin that may form glassy carbon through polymerization, hardening, and carbonization. In the present disclosure, embodiments are described based on thermosetting resins. However, embodiments of the present disclosure are not limited to thermosetting resins. For example, photocurable high carbon resins may also be used.

In addition, a high carbon polymer resin mixed with solvent for increasing fluidity may be used as a raw material for manufacturing the high carbon polymer roll precursor 10, and to reduce contraction while the high carbon polymer roll precursor 10 is carbonized, particles of various carbon materials such glassy carbon, graphite, graphene, carbon nanotubes may be mixed with the high carbon polymer resin.

The glassy carbon or vitreous carbon (VC) is a non-graphitizable carbon material whose structure is obtained during a thermal decomposition process of a high carbon polymer precursor such as a furan resin, a phenolic resin, or a polycarbodiimide resin. The glassy carbon does not have sufficient energy for transition to the graphite atom arrangement and thus does not exhibit anisotropy even though being thermally treated at a high temperature (3000° C.), thereby having electrical, mechanical, and optical isotropy, high chemical resistance, mechanical characteristics, and high shape stability in high-temperature, high-pressure conditions. Thus, the glassy carbon may be used as a mold material for glass molding press processes or hot plastic forming processes of metallic materials.

In the present embodiment, the high carbon polymer precursor is prepared in the form of a roll having a circumferential surface, and the intaglio pattern 102a corresponding to the fine pattern 101a is formed on the circumferential surface to form the roll precursor 10. Then, the roll precursor 10 is carbonized, thereby fabricating the glassy carbon roll-type mold 102 on which the intaglio pattern 102a is formed.

During the carbonization process, the temperature of a furnace is increased at a low rate in a temperature range in which thermal decomposition actively occurs such that a large amount of gas generated during thermal decomposition may be stably discharged from the roll precursor 10. For example, within a range from room temperature to about 600° C. in which most thermal decomposition occurs, the carbonization process may be performed at a sufficiently slow rate by maintaining the rate of temperature increase at about 1° C./min with a constant temperature period of 60 minutes after each temperature increase of 60° C. Thereafter, the carbonization process may be performed at a temperature increase rate of 5° C./min until a final carbonization temperature of about 1000° C. and then in a constant temperature period of about 1 hour to about 2 hours. During the carbonization process, oxidation of the roll precursor 10 may be prevented by feeding inert gas such as $N_2$ into the furnace at a rate of 500 cc/min to perform the carbonization process in an inert atmosphere. Alternatively, the carbonization process may be performed in a vacuum atmosphere.

In the glassy carbon roll-type mold manufacturing method for fine pattern formation of the embodiment, the roll precursor 10 having the intaglio pattern 102a (corresponding to the fine pattern 101a to be formed) is formed of the high carbon polymer resin, and the roll precursor 10 is carbonized through the carbonization process, thereby making it possible to manufacture the glassy carbon roll-type mold 102 (for forming a fine pattern on a substrate such as a glass or metal substrate) which is not deformed or damaged in high-temperature, high-pressure environments and has improved surface qualities. A fine pattern 101a may be precisely and efficiently formed on a large glass or metal substrate using the glassy carbon roll-type mold 102.

Figure 3:
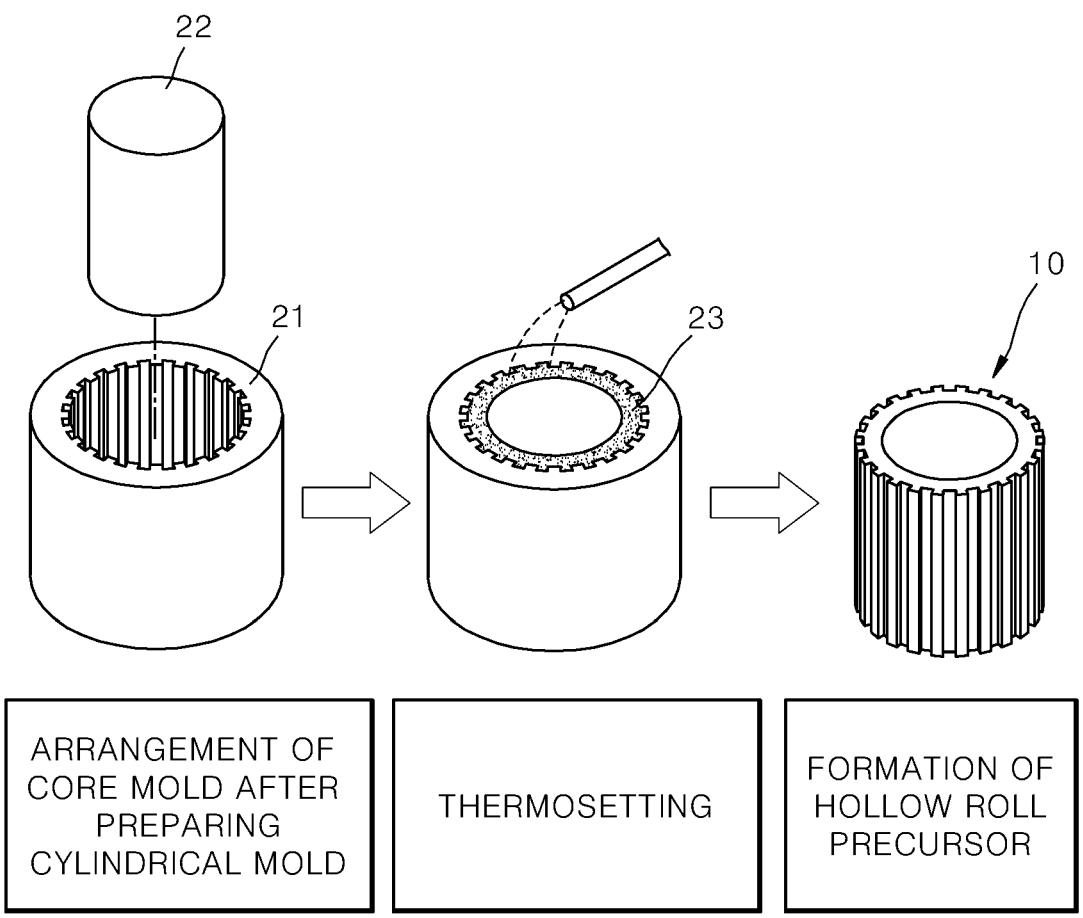
FIG. 3 is a view illustrating a roll precursor preparing process according to an embodiment.

FIG. 3 is a view illustrating a roll precursor preparing process according to an embodiment.

Referring to FIG. 3, the roll precursor preparing process of the embodiment includes a process of preparing a cylindrical mold 21, a process of placing a core mold 22, and a thermosetting process of a high carbon polymer resin.

In the process of preparing the cylindrical mold 21, the cylindrical mold 21 having an inner surface, on which a pattern corresponding to a master pattern is formed, is prepared. In the process of placing the core mold 22, the core mold 22 is placed in a center portion of the cylindrical mold 21, and thus a ring-shaped space is formed between the cylindrical mold 21 and the core mold 22. In the thermosetting process, a high carbon polymer material 23 is injected into the ring-shaped space and is then thermoset.

In the roll precursor preparing process of the present embodiment, a hollow roll-type mold may be fabricated using the cylindrical mold 21 which is relatively easily fabricated, and the core mold 22 having a cylindrical shape. As compared to a solid roll-type mold, the hollow roll-type mold may have fewer defects such as cracks and deformation during a carbonization process for forming an amorphous carbon roll-type mold.

Figure 4:
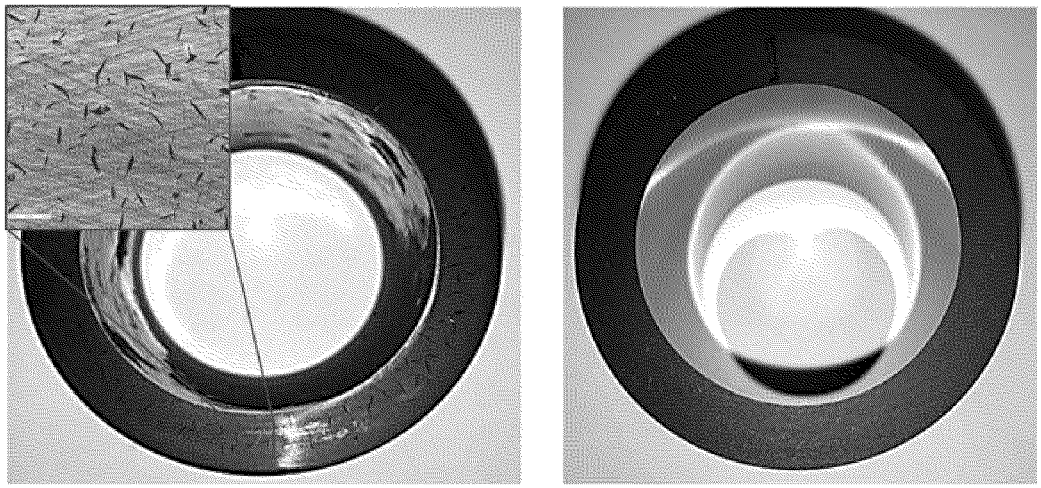
FIG. 4 is a view illustrating characteristics of a hardening process according to an embodiment.

In the thermosetting process, the high carbon polymer material 23 undergoes isotropic contraction during polymerization, and thus the inner and outer diameters of a roll precursor 10 decrease. When the high carbon polymer material 23 injected into the ring-shaped space between the cylindrical mold 21 and the core mold 22 undergoes contraction during polymerization, a decrease in the inner diameter of the high carbon polymer material 23 is limited by the core mold 22, and thus stress arises. If stress continuously acts after hardening occurs to some degree, cracks may be formed inside the high carbon polymer material 23. FIG. 4 shows a high carbon polymer pattern roll formed through a one-step hardening process by sufficiently thermosetting the high carbon polymer material 23 in the ring-shaped space and separating the high carbon polymer material 23, the high carbon polymer pattern roll having fine cracks in a roll-type mold precursor because inner diameter contraction is limited by the core mold 22.

To prevent the formation of such fine cracks, the thermosetting process may be performed by primarily incompletely hardening the high carbon polymer material 23 in the cylindrical mold 21 at a first temperature, separating the high carbon polymer material 23 from the cylindrical mold 21, and secondarily completely hardening the high carbon polymer material 23 at a temperature higher than the first temperature. In this case, the roll precursor 10 may not be damaged due to contraction during the thermosetting process. Here, the word "incompletely" is used to indicate a state in which hardening proceeds, and the word "completely" is used to a state in which hardening is finished.

For example, the incomplete hardening process (primary thermosetting process) may be performed at a temperature of 70° C. or less for 5 hours or less, and the complete hardening process (secondary thermosetting process) may be performed while increasing the hardening temperature at a given rate to a temperature of about 70° C. to about 200° C., thereby completely hardening a primarily hardened thermosetting resin precursor layer and forming the roll precursor 10 in a completely hardened state. Here, hardening is performed at the given rate to prevent a rapid temperature increase and thus to lessen an increase in the rate of polymerization, an increase in internal stress, and blockage of a gas discharge path. For example, the secondary hardening process may be performed at a temperature increase rate of about 0.1° C./min to a temperature of about 100° C. with a constant temperature period of about 60 minutes after each temperature increase of 5° C.

As described above, in the present embodiment, the roll precursor 10 is formed by two-step hardening. Therefore, referring to FIG. 4, although a roll precursor 10 formed by one-step hardening is cracked or deformed due to contraction, the present embodiment makes it possible to manufacture a roll precursor 10 and a roll-type mold having high surface qualities and durability.

The Shore D hardness of the roll precursor 10 may be in the range of about 10 to about 60 after the incomplete hardening process, and in the range of about 80 or greater after the complete hardening process. If the roll precursor 10 is separated from the cylindrical mold 21 in a state in which the roll precursor 10 has a Shore D hardness of less than 10 after the incomplete hardening process, a pattern 102*a* formed on the roll precursor 10 may be damaged while the pattern 102*a* is separated from a pattern formed on the inner surface of the cylindrical mold 21. On the contrary, if the incomplete hardening process is performed until the Shore D hardness of the roll precursor 10 exceeds 60, since contraction of the roll precursor 10 is limited by the core mold 22 during the hardening process, internal cracks may be formed.

The roll precursor 10 may have a thickness of about 2 mm to about 8 mm to decrease deformation and internal defects during a carbonization process. If the thickness of the roll precursor 10 is less than about 2 mm, the roll precursor 10 may easily deform during a thermosetting process and a carbonization process due to a lack of rigidity, and if the thickness of the roll precursor 10 is greater than about 8 mm, the roll precursor 10 may be non-uniformly carbonized during a carbonization process and may thus undergo cracking, breakage, or deformation.

Figure 5:
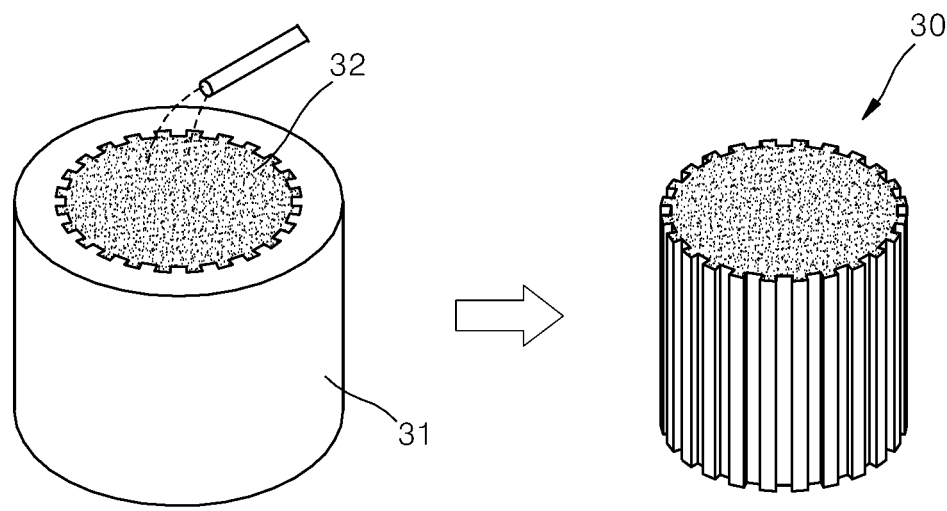
FIG. 5 is a view illustrating a roll precursor preparing process of the glassy carbon roll-type mold manufacturing method for fine pattern formation according to another embodiment.

FIG. 5 is a view illustrating a roll precursor preparing process of the glassy carbon roll-type mold manufacturing method for fine pattern formation according to another embodiment.

As illustrated in FIG. 5, in the roll precursor preparing process of the present embodiment, a high carbon polymer material 32 is injected into a cylindrical mold 31 having an inner surface on which a pattern corresponding to an intaglio pattern 102*a* (for forming a fine pattern on a surface) is formed, and the high carbon polymer material 32 is thermoset and separated from the cylindrical mold 31. A roll precursor 30 fabricated through the roll precursor preparing process has a solid center portion unlike the roll precursor 10 of the previous embodiment having an empty center portion. In the glassy carbon roll-type mold manufacturing method for micro and nano patter formation of the embodiment, a solid amorphous carbon roll-type mold having a solid inner portion may be fabricated unlike the previous embodiment in which a hollow roll-type mold is fabricated, and in a subsequent process for forming a glass or metal material using a roll, the roll-type mold may have relatively high mechanical rigidity.

Figure 6:
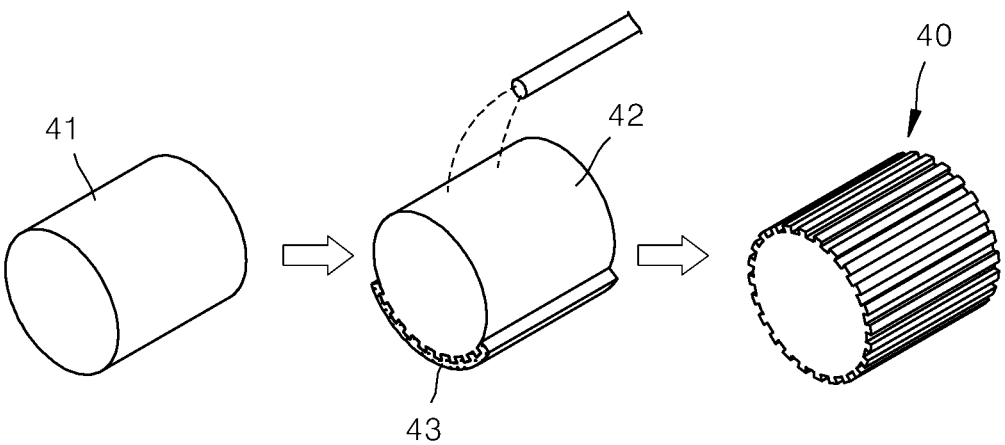
FIG. 6 is a view illustrating a roll precursor preparing process of the glassy carbon roll-type mold manufacturing method for fine pattern formation according to another embodiment.

FIG. 6 is a view illustrating a roll precursor preparing process of the glassy carbon roll-type mold manufacturing method for fine pattern formation according to another embodiment.

As illustrated in FIG. 6, the roll precursor preparing process of the present embodiment includes a solid core precursor preparing process, a coating layer forming process, and a thermosetting process. In the solid core precursor preparing process, a solid core precursor 41 having a solid center portion and a smooth non-patterned outer surface is prepared. In the coating layer forming process, the outer surface of the solid core precursor 41 is coated with a liquid high carbon polymer material 42 to form a coating layer. In the thermosetting process, a flexible pattern mold 43 having a pattern corresponding to a fine pattern 101*a* is wrapped around the coating layer to form the fine pattern 101*a* on the coating layer, and then the liquid high carbon polymer material 42 is thermoset.

According to the present embodiment, the roll-type mold manufacturing method for fine pattern formation may prevent damage to the fine pattern 101*a* that may occur when a roll precursor is separated from a cylindrical mold having a fine pattern on an inner surface thereof in the roll precursor manufacturing processes described with reference to FIGS. 3 and 5. In the roll precursor manufacturing process described with reference to FIG. 6, the solid core precursor 41 is formed using a cylindrical mold having no fine pattern on an inner surface thereof, and the fine pattern 101*a* is formed on the outer surface of the solid core precursor 41 through a duplication process using the flexible pattern mold 43. Therefore, the fine pattern 101*a* may not be damaged when separated from the flexible pattern mold 43. In this case, the solid core precursor 41 and the high carbon polymer material 42 forming a pattern portion may include the same material or materials having similar carbon contents, and thus in a subsequent carbonization process, contraction caused by thermal decomposition may uniformly occur, thereby preventing separation or cracking that may be caused by different contraction rates.

Figure 7:
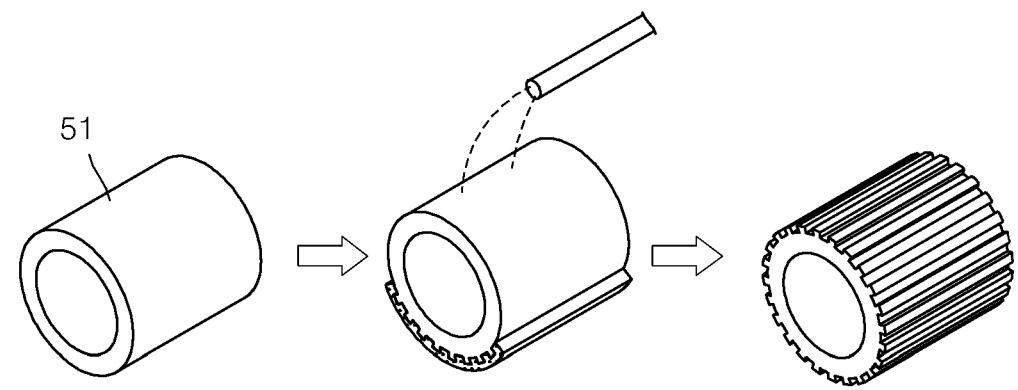
FIG. 7 is a view illustrating a roll precursor preparing process of the glassy carbon roll-type mold manufacturing method for fine pattern formation according to another embodiment.

FIG. 7 is a view illustrating a roll precursor preparing process of the glassy carbon roll-type mold manufacturing method for fine pattern formation according to another embodiment.

The roll precursor preparing process of the present embodiment includes a hollow core precursor preparing process, a coating layer forming process, and a thermosetting process. Unlike the embodiment shown in FIG. 6 in which the core precursor 41 has a solid center portion, a hollow core precursor 51 having an empty center portion is used in the present embodiment. However, the other configuration is the same as in the embodiment shown in FIG. 6. A hollow roll precursor may be uniformly carbonized through a carbonization process, and the possibility that the hollow roll precursor has cracks and deformation defects is lower than the possibility that a solid roll precursor has cracks and deformation defects.

In the hollow core precursor preparing process, a core mold for thermosetting is placed in a center portion of a cylindrical mold having no pattern on an inner surface thereof to form a ring-shaped space, and a high carbon polymer material is injected into the ring-shaped shape and is then thermoset. In this case, the high carbon polymer material may be primarily incompletely hardened at a first temperature in the ring-shaped space, and may then be separated from the molds and secondarily completely hardened at a temperature higher than the first temperature. That is, a roll precursor is formed through this two-step hardening process, and thus the roll precursor may not be damaged due to contraction during the hardening process.

Figure 8:
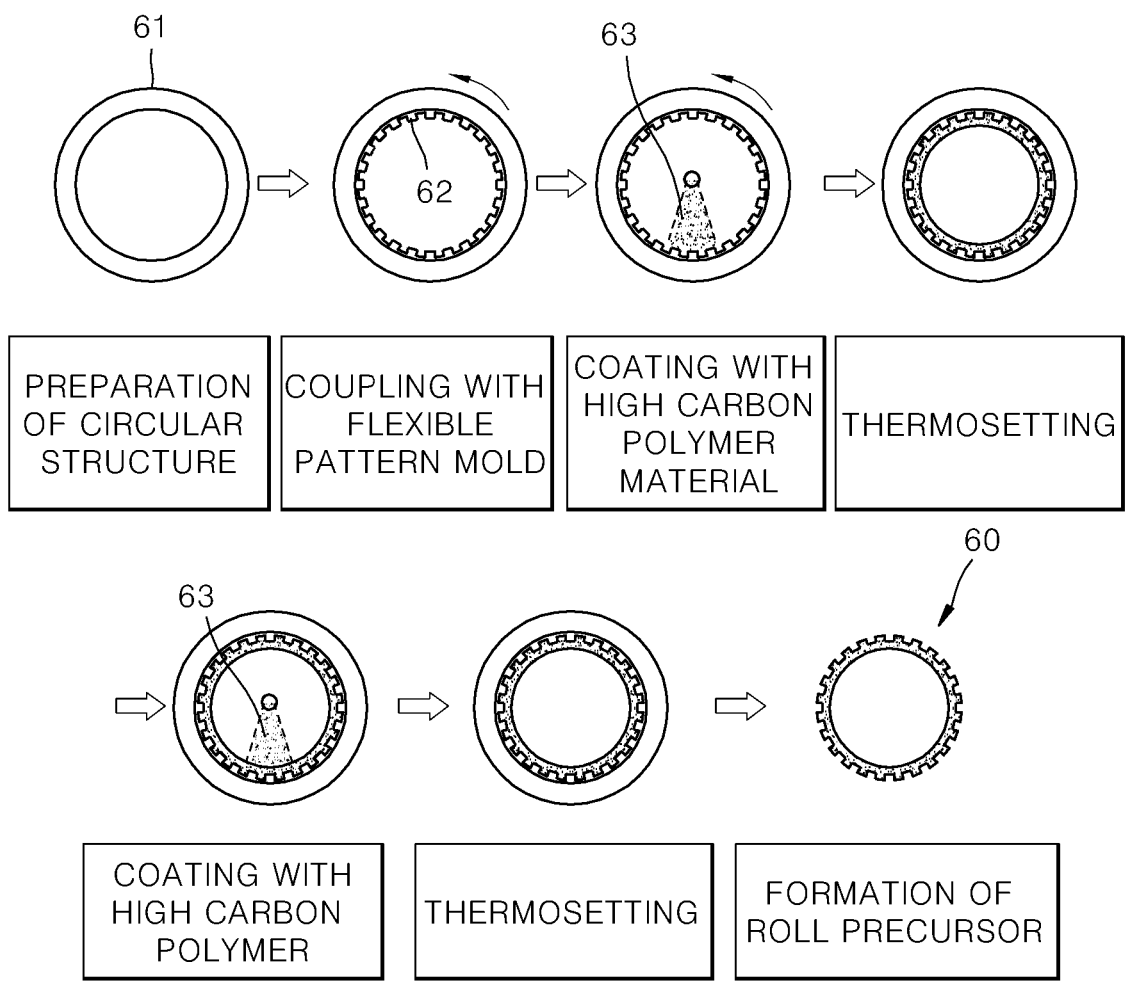
FIG. 8 is a view illustrating a roll precursor preparing process of the glassy carbon roll-type mold manufacturing method for fine pattern formation according to another embodiment.

FIG. 8 is a view illustrating a roll precursor preparing process of the glassy carbon roll-type mold manufacturing method for fine pattern formation according to another embodiment.

The roll precursor preparing process of the present embodiment includes a circular structure preparing process, a flexible pattern mold coupling process, a coating process, and a thermosetting process. In the flexible pattern mold coupling process, a flexible pattern mold 62 having a pattern corresponding to a fine pattern 101*a* is coupled to an inner surface of a cylindrical structure 61 in a manner in which a patterned surface of the flexible pattern mold 62 faces the center of the cylindrical structure 61. In the coating process, the patterned surface of the flexible pattern mold 62 is coated with a liquid high carbon polymer material 63 while rotating the cylindrical structure 61. In the thermosetting process, the high carbon polymer material 63 is hardened and is then separated from the flexible pattern mold 62. In this case, the coating process with the high carbon polymer material 63 and the thermosetting process of the carbon polymer material 63 may be completed by performing the processes once, or sequentially repeating the processes. In the roll precursor preparing processes described with reference to FIGS. 3 to 7, internal pores may be formed because a gas discharge path is limited when a high carbon polymer material is injected into a cylindrical mold and is hardened. However, in the thermosetting process of the roll precursor of the present embodiment, the inner surface of the roll precursor is exposed, and thus gas generated during hardening may be easily discharged, thereby reducing the formation of internal pore defects. In addition, FIG. 9 is a view illustrating a cylindrical mold forming process according to another embodiment.

Figure 9:
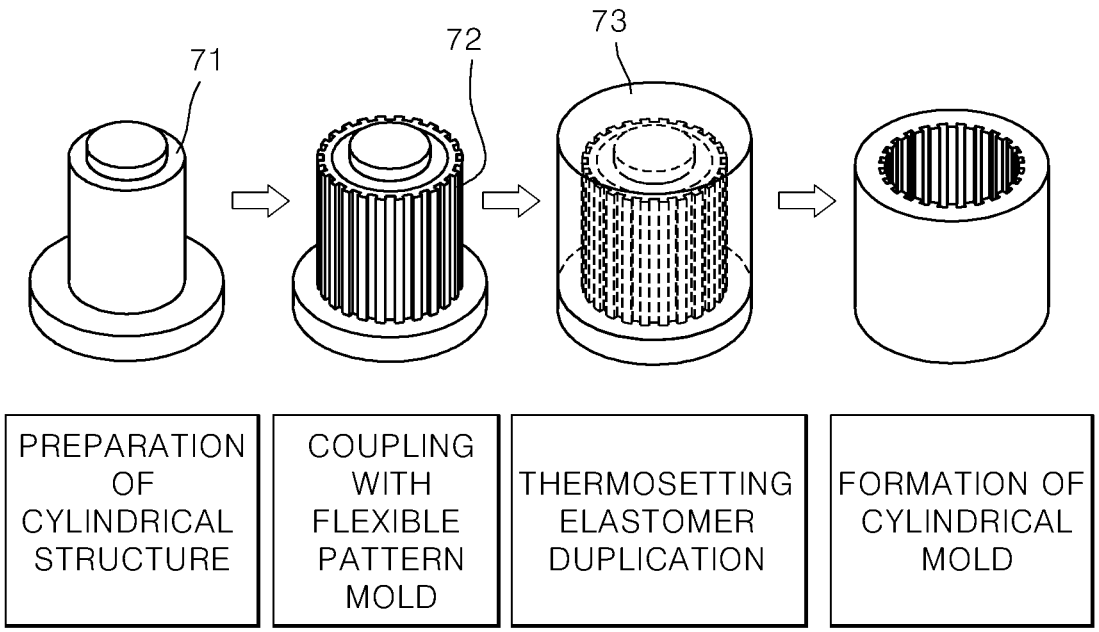
FIG. 9 is a view illustrating a cylindrical mold forming process according to another embodiment.

Although a cylindrical mold providing a basic frame for manufacturing a roll precursor may be manufactured using various materials and processes, FIG. 9 illustrates a cylindrical mold manufacturing method using a thermosetting elastomer such as silicon rubber (a typical example is polydimethylsiloxane (PDMS) by Dow Corning) to easily separate a hardened high carbon polymer material. A flexible pattern mold 72 having a pattern corresponding to a fine pattern (to be formed on a substrate) is coupled to an outer surface of a cylindrical mold 71 in a surrounding manner, and a liquid thermosetting elastomer and a hardener is put around the outer surface of the cylindrical mold 71 and is then hardened through a thermosetting process. Thereafter, the hardened thermosetting elastomer 73 is separated and used as a cylindrical mold.

In addition, a cylindrical mold may be provided by machining an inner surface of a circular structure formed of a metal, a polymer, or a ceramic material, or by coupling a flexible pattern mold to the inner surface of the circular structure. In this case, the cylindrical mold may have an assembled structure such that a roll precursor hardened inside the cylindrical mold may be easily separated.

Figure 10:
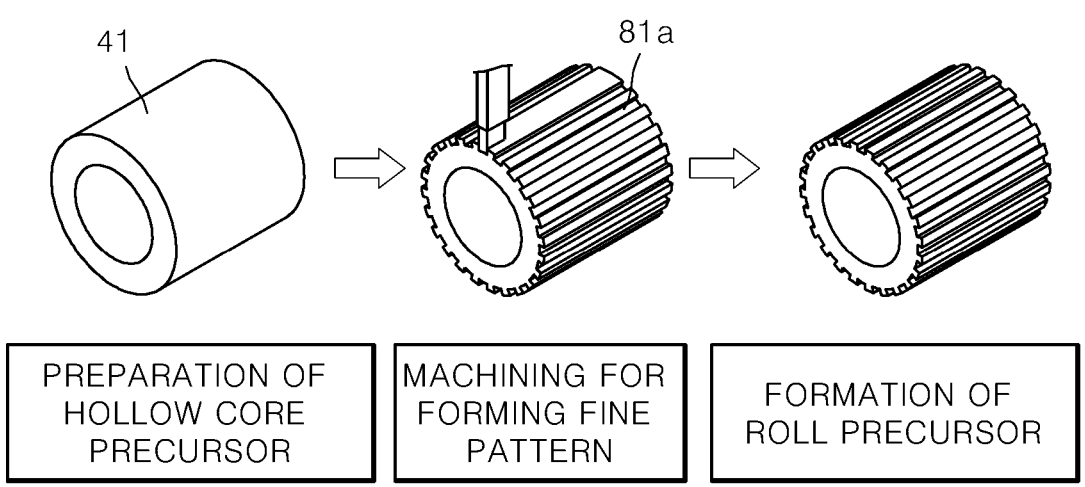
FIG. 10 is a view illustrating a fine pattern forming process according to another embodiment.

FIG. 10 is a view illustrating a fine pattern forming process according to another embodiment.

In the present embodiment, a fine pattern 81a is formed by performing a machining process on a hollow core precursor. In the present embodiment, a hollow core precursor is illustrated. However, a fine pattern may be formed by performing a machining process on a solid core precursor.

Figure 11:
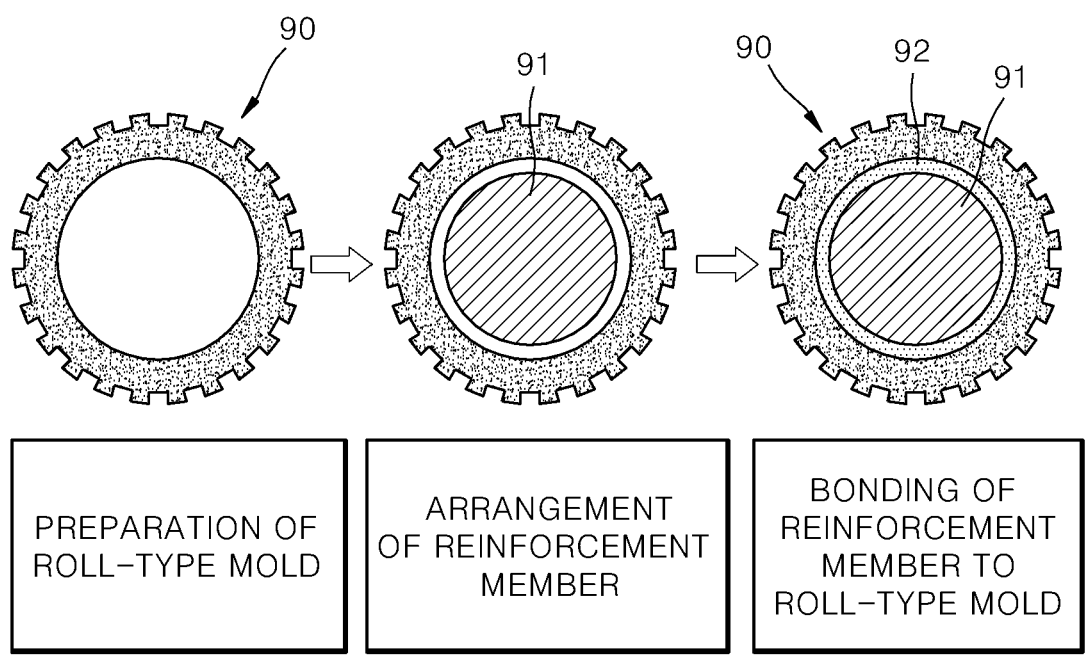
FIG. 11 is a view illustrating a roll-type mold according to an embodiment and the roll-type mold in which a reinforcement member is placed according to another embodiment.

FIG. 11 is a view illustrating a roll-type mold according to an embodiment and the roll-type mold in which a reinforcement member is placed according to another embodiment.

A glassy carbon roll-type mold 90 manufactured by carbonizing a high carbon polymer roll precursor fabricated by the above-described method may be used to stably form a fine pattern having a micro-nano structure without deformation of a roll-type mold pattern or damage to the roll-type mold pattern in a high-temperature, high-pressure environment of a forming process in which a fine pattern is continuously formed using a roll on a substrate such as a glass or metal substrate. If the glassy carbon roll-type mold 90 is hollow with an empty center portion as shown in the left side of FIG. 11, a reinforcement member 91 for complementing mechanical rigidity may be placed in the glassy carbon roll-type mold 90 and coupled to the glassy carbon roll-type mold 90 by a method such as bonding (a bonding layer 92) to improve the strength of the glassy carbon roll-type mold 90. Such reinforcement may be accomplished using a reinforcement member. However, instead of using a reinforcement member, a reinforcement material may be filled in a hollow roll-type mold for the same purpose.

As described above, according to the one or more of the above embodiments, in the glassy carbon roll-type mold manufacturing method, a roll precursor having a master pattern (corresponding to a fine pattern to be formed) is prepared using a thermosetting resin such as a glass carbon material, and the roll precursor is carbonized. Therefore, a roll-type mold having high-quality surface characteristics and free from deformation or damage in a high-temperature, high-pressure environment may be manufactured (to use the roll-type mold to form a fine pattern on a substrate such as a glass or metal substrate). In addition, since the roll-type mold is formed by carbonizing the roll precursor having the master pattern, a pattern may be precisely and efficiently formed on a large area of a substrate by using the roll-type mold.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of manufacturing a glassy carbon roll-type mold for forming a fine pattern having a micro and/or nano structure on a substrate, the method comprising:
   preparing a roll precursor comprising a carbon polymer material, wherein the roll precursor has a roll shape with a circumferential surface on which a pattern corresponding to the fine pattern is formed; and
   carbonizing the roll precursor,
   wherein the preparing of the roll precursor comprises:
   preparing a cylindrical mold having an inner surface on which the pattern corresponding to the fine pattern is formed;
   placing a core mold in a center portion of the cylindrical mold to form a ring-shaped space between the cylindrical mold and the core mold; and
   injecting the carbon polymer material into the ring-shaped space, thermosetting the carbon polymer material, and separating the carbon polymer material from the cylindrical mold.

2. The method of claim 1, wherein the thermosetting of the carbon polymer material comprises primarily incompletely hardening the carbon polymer material in the cylindrical mold at a first temperature and secondarily completely hardening the carbon polymer material at a temperature higher than the first temperature after separating the carbon polymer material from the cylindrical mold.

3. The method of claim 2, wherein a shore D hardness of the roll precursor is within a range from about 10 to about 60 after the primary incomplete hardening and is 80 or greater after the secondary complete hardening.

4. The method of claim 1, wherein the roll precursor has a thickness of about 2 mm to about 8 mm.

5. The method of claim 1, wherein the preparing of the cylindrical mold comprises wrapping a flexible pattern mold having the pattern corresponding to the fine pattern around an outer surface of a cylindrical structure, and performing a duplication process using a thermosetting elastomer.

6. A method of manufacturing a glassy carbon roll-type mold for forming a fine pattern having a micro and/or nano structure on a substrate, the method comprising:
preparing a roll precursor comprising a carbon polymer material, wherein the roll precursor has a roll shape with a circumferential surface on which a pattern corresponding to the fine pattern is formed; and
carbonizing the roll precursor,
wherein the preparing of the roll precursor comprises:
injecting the carbon polymer material into an inner space of a cylindrical mold having an inner surface on which the pattern corresponding to the fine pattern is formed;
thermosetting the carbon polymer material; and
separating the carbon polymer material from the cylindrical mold.

7. A method of manufacturing a glassy carbon roll-type mold for forming a fine pattern having a micro and/or nano structure on a substrate, the method comprising:
preparing a roll precursor comprising a carbon polymer material, wherein the roll precursor has a roll shape with a circumferential surface on which a pattern corresponding to the fine pattern is formed; and
carbonizing the roll precursor,
wherein the preparing of the roll precursor comprises:
preparing a solid core precursor having a smooth non-patterned outer surface and a solid center portion;
coating the outer surface of the solid core precursor with a liquid carbon polymer material to form a coating layer; and
thermosetting the coating layer after wrapping a flexible pattern mold having a pattern corresponding to the fine pattern around the coating layer.

8. A method of manufacturing a glassy carbon roll-type mold for forming a fine pattern having a micro and/or nano structure on a substrate, the method comprising:
preparing a roll precursor comprising a carbon polymer material, wherein the roll precursor has a roll shape with a circumferential surface on which a pattern corresponding to the fine pattern is formed; and
carbonizing the roll precursor,
wherein the preparing of the roll precursor comprises:
preparing a hollow core precursor having a smooth non-patterned outer surface and an empty center portion;
coating the outer surface of the hollow core precursor with a liquid carbon polymer material to form a coating layer; and
thermosetting the coating layer after wrapping a flexible pattern mold having the pattern corresponding to the fine pattern around the coating layer.

9. The method of claim 8, wherein the thermosetting of the coating layer comprises primarily incompletely hardening the coating layer at a first temperature after inserting a core mold for thermosetting into the hollow core precursor and secondarily completely hardening the coating layer at a temperature higher than the first temperature after separating the core mold from the hollow core precursor.

10. A method of manufacturing a glassy carbon roll-type mold for forming a fine pattern having a micro and/or nano structure on a substrate, the method comprising:
preparing a roll precursor comprising a carbon polymer material, wherein the roll precursor has a roll shape with a circumferential surface on which a pattern corresponding to the fine pattern is formed; and
carbonizing the roll precursor,
wherein the preparing of the roll precursor comprises:
coupling a flexible pattern mold having the pattern corresponding to the fine pattern to an inner surface of a cylindrical structure in a manner in which a patterned surface of the flexible pattern mold faces a center of the cylindrical structure;
coating the patterned surface with a liquid carbon polymer material while rotating the cylindrical structure; and
separating the coated carbon polymer material from the flexible pattern mold after thermosetting the coated carbon polymer material.

* * * * *